United States Patent
Okajima et al.

[11] Patent Number: 5,924,328
[45] Date of Patent: Jul. 20, 1999

[54] BRAKING DEVICE FOR BICYCLES

[75] Inventors: Shinpei Okajima, Izumi; Masanori Sugimoto, Osakasayama; Kazuhisa Yamashita, Sakai, all of Japan

[73] Assignee: Shimano, Inc., Osaka, Japan

[21] Appl. No.: 08/900,582

[22] Filed: Jul. 25, 1997

Related U.S. Application Data

[63] Continuation of application No. 08/419,127, Apr. 10, 1995, abandoned, and application No. 08/819,46 9, Mar. 17, 1997, which is a continuation of application No. 08/544,120, Oct. 17, 1995.

[30] Foreign Application Priority Data

Apr. 22, 1994 [JP] Japan .................................. 6-084216
Oct. 25, 1994 [JP] Japan .................................. 6-260128

[51] Int. Cl.$^6$ .................................................. G05G 11/00
[52] U.S. Cl. ............................ 74/489; 74/502.2; 188/2 D
[58] Field of Search ................................. 74/489, 502.2; 188/2 D

[56] References Cited

U.S. PATENT DOCUMENTS

| | | | |
|---|---|---|---|
| 4,301,694 | 11/1981 | Costa | 74/518 |
| 4,779,482 | 10/1988 | Kawaguchi | 74/523 |
| 4,977,792 | 12/1990 | Nagano | 74/502.2 |
| 5,279,179 | 1/1994 | Yoshigai | 74/502.2 |
| 5,279,180 | 1/1994 | Henriksson | 74/502.2 |
| 5,584,210 | 12/1996 | Gelbein | 74/489 |

FOREIGN PATENT DOCUMENTS

| | | | |
|---|---|---|---|
| 389931 B1 | 10/1990 | European Pat. Off. | B62L 3/02 |
| 1349334 | of 1964 | France . | |
| 3713100 A1 | 11/1988 | Germany | B62L 1/06 |
| 3923176 A1 | 2/1990 | Germany | B62L 3/02 |
| 9203082 U | 6/1992 | Germany | B62L 3/00 |
| 5-16865 | 1/1993 | Japan | B62L 3/02 |
| 615173 | 1/1949 | United Kingdom . | |

OTHER PUBLICATIONS

European Search Report for EP 95302569.9, dated Aug. 17, 1995.
European search report for EP 95307495.2, dated Apr. 18, 1997.

Primary Examiner—John A. Jeffery
Assistant Examiner—David Fenstermacher
Attorney, Agent, or Firm—James A. Deland

[57] ABSTRACT

The braking device of the present invention is equipped with a resistance element which acts so that, when the brake device is operated by pulling a brake lever to a set operating position where the wheel braking force produced by brake shoes reaches a certain set value, a discretely increased force resists operation of the brake lever so that further operation of said brake lever is inhibited until a pulling force which is greater than the resistance force is thereafter applied to the brake lever. A setting mechanism may be provided for setting the particular position of the brake lever at which the resistance discretely increases

52 Claims, 9 Drawing Sheets

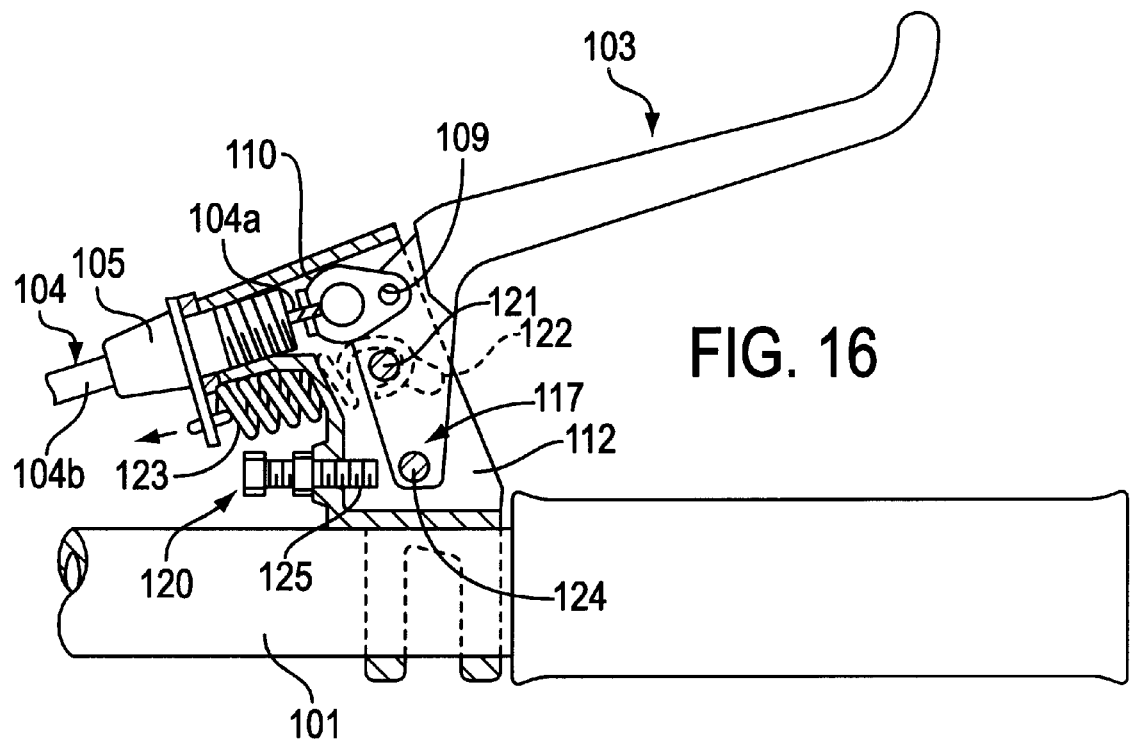
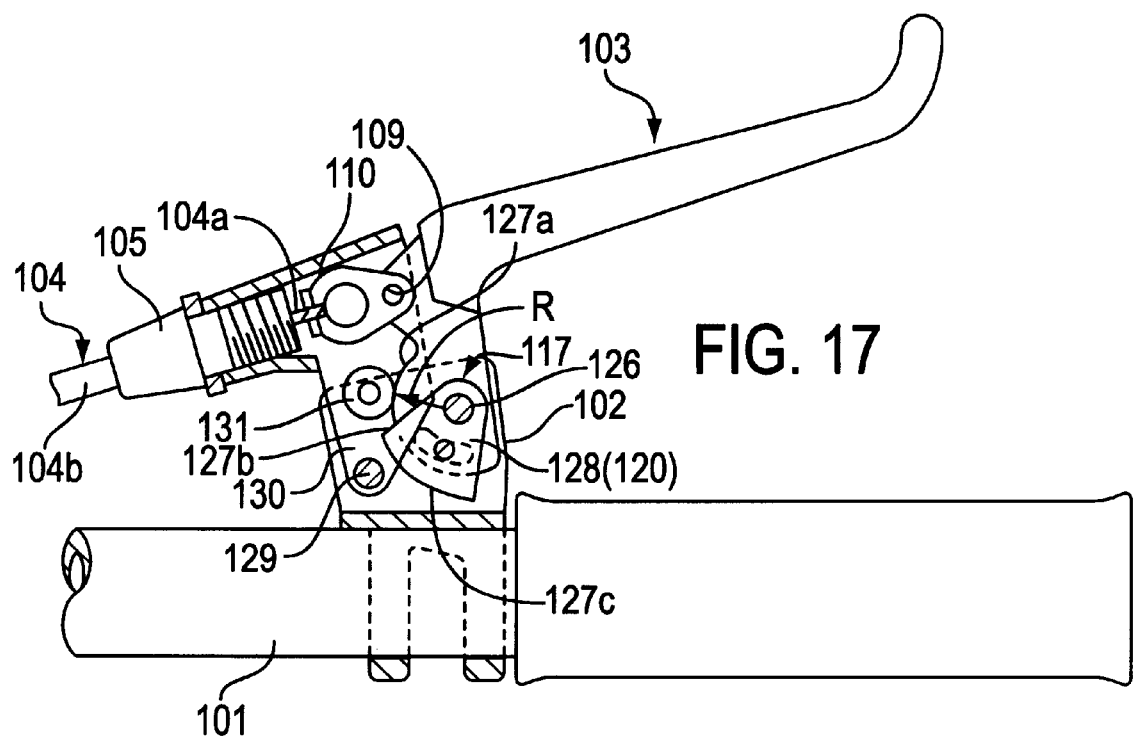

BRAKING DEVICE FOR BICYCLES

CROSS REFERENCE TO RELATED APPLICATIONS

This application is a combined continuation of application Ser. No. 08/419,127 now abandoned, filed Apr. 10, 1995 entitled "Braking Device for Bicycles," and copending application Ser. No. 08/819,469 filed Mar. 17, 1997 entitled "Brake Operating Device for Bicycles," which, in turn, is a file-wrapper-continuation of application Ser. No. 08/544,120 filed Oct. 17, 1995.

BACKGROUND OF THE INVENTION

The present invention is directed to braking devices for bicycles and, more particularly, to a braking device which is constructed so that the operating force of the brake lever can be varied as the brake lever is pulled.

A conventional bicycle brake is shown in FIG. 8 and disclosed in JP 5-16865. As shown in FIG. 8, a brake lever 3 is mounted via a pivot shaft 4 in a manner which allows said brake lever to pivot on a lever bracket 2 which is fastened to a handle-bar 1. Furthermore, a coil spring 21, one end of which is free, is attached to the aforementioned lever bracket 2 via a bolt 20, so that when the brake lever 3 is pulled, an extension part 3b extending from said brake lever 3 contacts the free end of the aforementioned coil spring 21 after the brake lever 3 has pivoted through a fixed stroke.

In this conventional braking device, as is shown in FIG. 9, the resistance to operation of the brake lever 3 increases when the brake lever 3 is pulled through the fixed stroke so that the extension part 3b contacts the coil spring 21. As a result, a larger operating force is required for any subsequent operation of the brake lever 3, so that the cyclist is able to sense the operating stroke of the brake lever 3.

In the above mentioned conventional braking device, as is shown in FIG. 9, the slope of the operating force of the brake lever 3 vs. the braking force only slightly changes in the vicinity of the operating point (B) where the extension part 3b of the brake lever 3 contacts the coil spring 21. Under normal operating conditions, the increased force can be sensed, and the cyclist may control the operation of the brake lever accordingly. However, in high performance situations such as racing the cyclist may not have sufficient time to give lengthy consideration to the braking characteristics. As a result, the cyclist may not apply the desired amount of braking force, thus resulting in decreased performance.

SUMMARY OF THE INVENTION

The present invention is directed to a bicycle braking device which ordinarily operates with a light operating force but which helps to prevent wheel locking even when the cyclist grasps the brake lever with a strong force. In general, the braking device of the present invention is equipped with a resistance element which acts so that, when the brake device is operated by pulling a brake lever to a set operating position where the wheel braking force produced by brake shoes reaches a certain set value, a discretely increased force resists operation of the brake lever so that further operation of said brake lever is inhibited until a pulling force which is greater than the resistance force is thereafter applied to the brake lever.

In one embodiment of the present invention, a brake lever is pivotally mounted to a mounting member, and a resistance means is disposed between the lever and the mounting member. The resistance means discretely increases resistance to movement of the lever when the lever moves to a desired position so that further movement of the lever is inhibited until a desired force is applied to the lever. In this embodiment, the brake lever is pivotally mounted to a lever bracket through a pivot shaft so that a grip part of the brake lever extends from the pivot shaft in one direction and an extension part extends from the pivot shaft in another direction. A resistance element is disposed between the extension part of the brake lever and mounting member. The resistance element comprises rod having first and second portions. An abutment is disposed on the first portion for receiving a first end of a coil spring, and the second end of the rod extends past the mounting member so that a second end of the coil spring is received by the mounting member. The coil spring is precompressed so that, when the extension part contacts the resistance element, the resistance element instantly increases resistance to movement of the lever in a step-wise manner so that further movement of the lever is inhibited until a desired force is applied to the lever. The amount of precompression of the coil spring may be adjusted to suit different riders.

In another embodiment of the invention, a stepped surface is disposed on one of the lever or the mounting member, and an engaging member is coupled to the other one of the lever or mounting member. A portion of the engaging member moves along the stepped surface so that contact between the step and the engaging member resists further movement of the lever.

In another embodiment of the present invention, the brake lever is mounted to the mounting member at a mounting location and is adapted both to pivot about the mounting location and to move linearly relative to the mounting location. The brake lever includes a grip portion extending from the mounting location, and a resistance element is located so that the brake lever pivots about the mounting location until the resistance element contacts an engaging member, and thereafter the lever pivots about the point of contact between the resistance element and the engaging member to change the lever ratio. More specifically, a distance between the point of contact of the resistance element and the engaging member to the grip portion of the brake lever in a direction perpendicular to the grip portion of the brake lever is greater than a distance between the mounting location and the grip portion of the brake lever in a direction perpendicular to the grip portion of the brake lever. Consequently, the torque applied to the brake lever instantly decreases when the brake lever begins to pivot about the point of contact between the resistance element and the engaging member.

Some embodiments of the present invention include a mechanism for setting the particular position of the brake lever at which the resistance discretely increases to accommodate different riders. In one example of such embodiments, a brake lever is pivotally mounted to a mounting member, a resistance means is disposed between the brake lever and the mounting member for discretely increasing resistance to movement of the brake lever when the brake lever moves to a particular position so that further movement of the brake lever is inhibited until a force is applied to the brake lever, and a setting means is provided for setting the particular position of the brake lever at which the resistance discretely increases. In a more specific embodiment, a pivot member is pivotally coupled to the brake lever at a first location and to the mounting member at a second location, a stopper is disposed between the pivot member and the brake lever, and a portion of the brake lever contacts the stopper when the brake lever pivots about the first location for discretely increasing the resistance. The stopper is movably mounted relative to the portion of the brake lever and includes a contact surface which varies in shape so that the portion of the brake lever contacts the contact surface at different positions depending upon the relative position of the stopper.

In a further specific embodiment of a mechanism for setting the particular position of the brake lever at which the resistance discretely increases, the brake lever is mounted to the mounting member at a mounting location and is adapted both to pivot about the mounting location and to move linearly relative to the mounting location. In this embodiment, an adjustable stopper is located so that the brake lever pivots about the mounting location until a portion of the brake lever contacts the stopper, and thereafter the lever pivots about the point of contact between the portion of the brake lever and the stopper. The position of the brake arm at which the resistance increases is varied by adjusting the stopper.

In yet another embodiment of a mechanism for setting the particular position of the brake lever at which the resistance discretely increases, the resistance means comprises a stepped surface and an engaging member which moves along the stepped surface as the brake lever is moved so that a step resists further movement of the brake lever. In this embodiment, the brake lever is pivotally coupled to the mounting member at a mounting location so that a grip part of the brake lever extends from the mounting location and an extension part forming a first cam surface radially extends from the mounting location. The stepped surface is disposed on the extension part of the brake lever. The setting means comprises a cam member pivotally mounted relative to the extension part and having a second cam surface which extends further than the first cam surface for forming the step. Thus, the position of the cam member determines the position of the step and thereby the particular position of the brake lever at which the resistance discretely increases.

BRIEF DESCRIPTION OF THE DRAWINGS

FIG. 16 is a partially cut-away view illustrating an alternative embodiment of a brake operating device with a mechanism for setting the particular position of the brake lever at which the resistance discretely increases according to the present invention; and FIG. 17 is a partially cut-away view illustrating another alternative embodiment of a brake operating device with a mechanism for setting the particular position of the brake lever at which the resistance discretely increases according to the present invention.

DETAILED DESCRIPTION OF THE EMBODIMENTS

Figure 1:
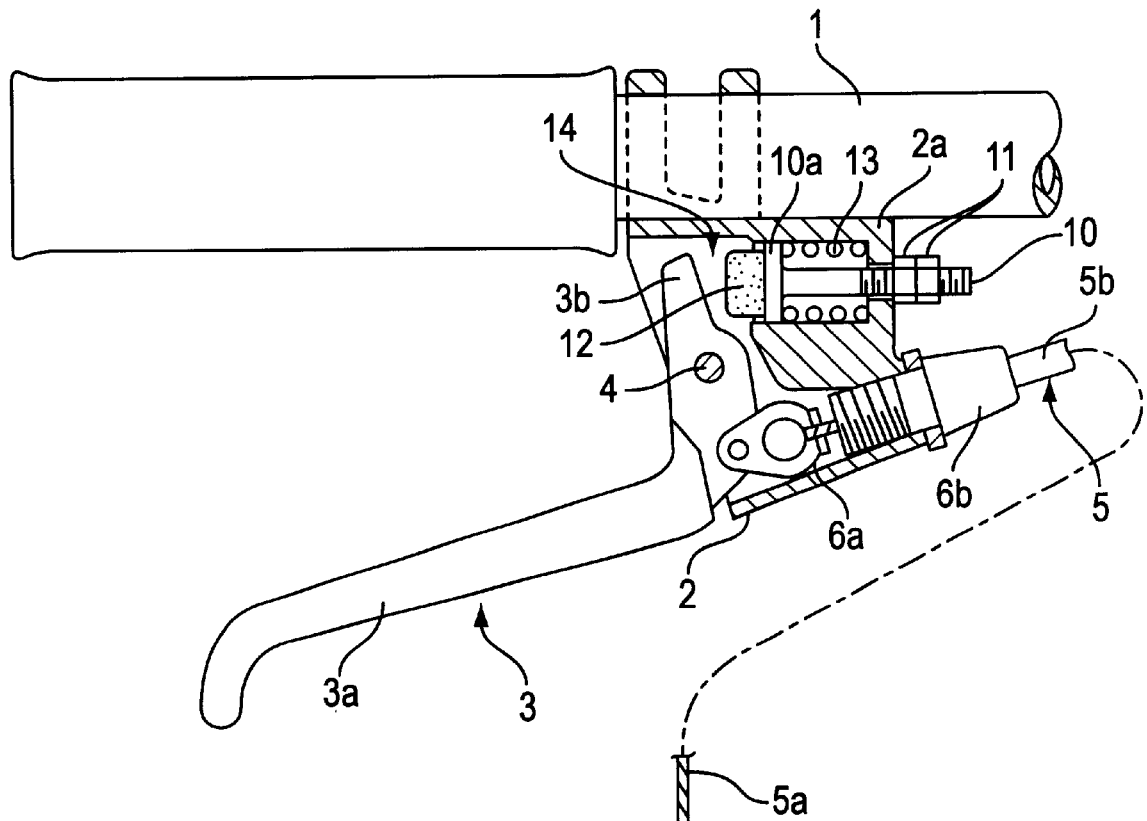
FIG. 1 is a partially cut-away plan view illustrating a first embodiment of a bicycle brake device according to the present invention.
Figure 1:
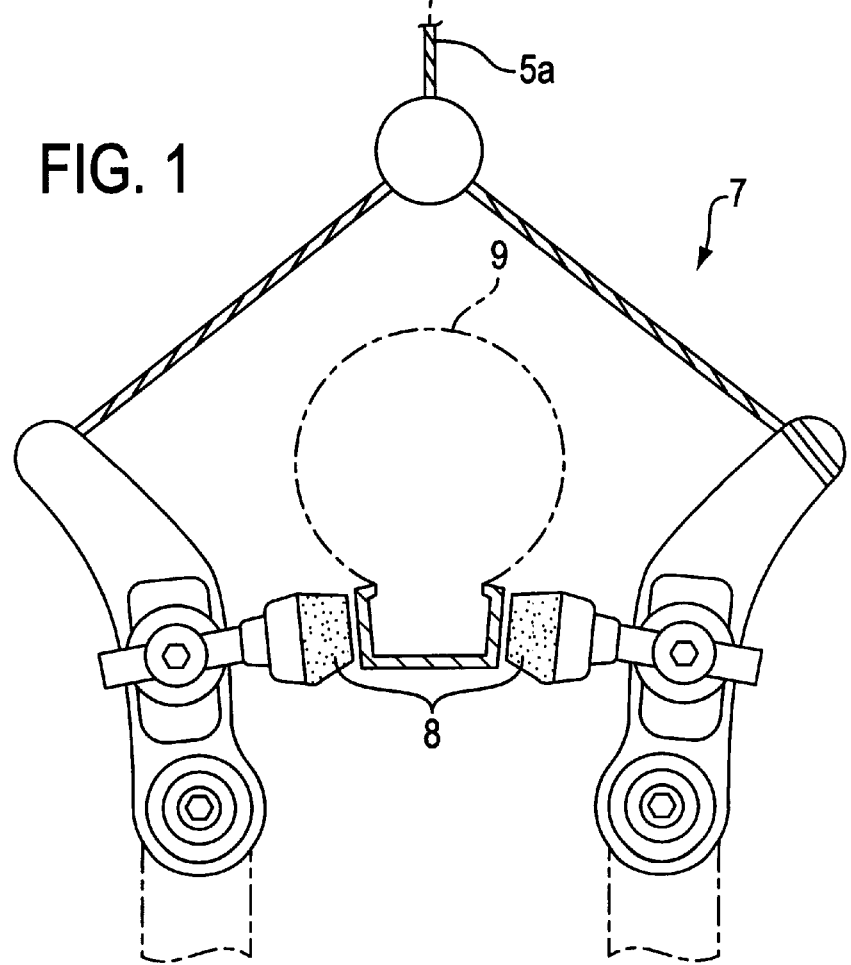

A first embodiment of a bicycle braking device according to the present invention will be described with reference to FIG. 1. As shown therein, a lever bracket 2 for the brake lever is attached to the handle-bar 1 of the bicycle, and a brake lever 3 is mounted on the lever bracket 2 by means of a pivot shaft 4 so that the brake lever 3 is free to pivot from a first (home) position shown in FIG. 1 to a second (brake engaging) position shown in FIG. 2. An attachment part 6a which is used to attach one end of the inner wire 5a of the brake wire 5 to the brake lever 3 is pivot-mounted on the brake lever 3 in a position located further toward the grip part 3a of the brake lever 3 than the pivot shaft 4. An attachment part 6b for the outer wire 5b of the brake wire 5 is screw-attached to the lever bracket 2.

The other end of the inner wire 5a attached to the inner-wire attachment part 6a is coupled to an ordinary cantilever brake 7. When the grip part 3a of the brake lever 3 is gripped and the brake lever 3 is pulled, the brake shoes 8 of the cantilever brake 7 press against both sides of the rim of the rear wheel 9 of the bicycle so that a braking force is applied to the rear wheel 9. Afterward, when the brake lever 3 is released, the brake lever 3 is elastically returned to its original position in the same manner as in a conventional braking device by a return spring (not shown) installed on the cantilever brake 7 or a return spring installed on the brake lever 3, etc.

A cylindrical body 2a which is closed at one end is formed as an integral part of the lever bracket 2, and a rod-form body 10 which has a male screw part formed at one end is positioned inside this cylindrical body 2a. The male screw part of this rod-form body 10 is passed through a through-holed formed in the bottom of the cylindrical body 2a so that the male screw parts extends to the outside, and a nut member 11 is screwed onto this male screw part. A flange 10a is formed as an integral part of the rod-form body 10 on the other end of the rod-form body 10, and a contact member 12 which consists of a wear-resistant material is fastened to the flange 10a. Furthermore, a coil spring 13 which is mounted around the outside of the rod-form body 10 is interposed in a compressed state between the flange 10a and the bottom of the cylindrical body 2a, so that the contact member 12 is elastically driven toward the open end of the cylindrical body 2a.

An extension part 3b used for pushing is formed as an integral extension of the brake lever 3 on the opposite side of the pivot shaft 4 from the grip part 3, so that when the brake lever 3 is gripped and pulled, the extension part 3b contacts the contact member 12 after the brake lever 3 is pivoted through a fixed stroke, thus temporarily preventing further pivoting of the brake lever 3. In other words, as will be described in detail later, the pivoting operation of the brake lever 3 is temporarily prevented by the action of a resistance means 14 consisting of the rod-form body 10 and coil spring 13, etc.

Figure 3:
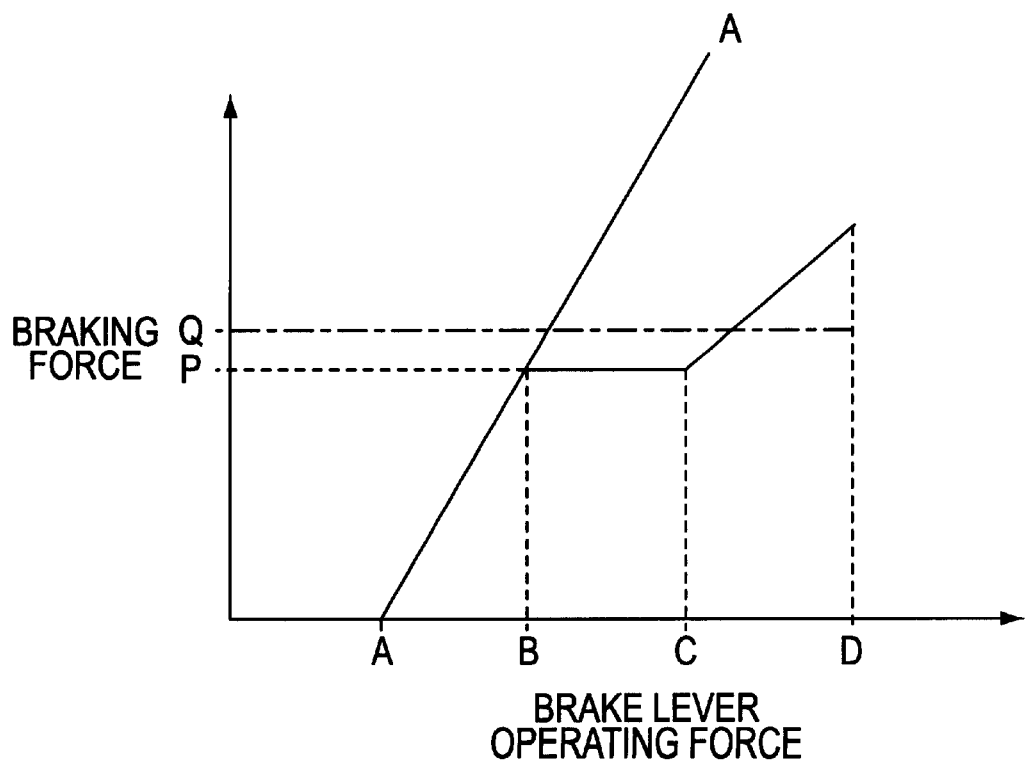
FIG. 3 is a graph illustrating the braking performance of the bicycle brake device shown in FIGS. 1 and 2.

When the grip part 3a of the brake lever 3 is grasped and pulled, the operating force of the brake lever 3 is transmitted to the cantilever brake 7 via the inner wire 5a, so that the brake shoes 8 move toward the sides of the rim of the rear wheel 9 in the same manner as in an ordinary braking device. In the initial state of so-called "empty pulling", almost no operating force is required until the brake shoes 8 contact the rim of the wheel. However, as is shown in FIG. 3, the operating force gradually increases beginning at operating point (A), where the brake shoes 8 contact the rim, and the braking force increases in proportion to the operating force. As the brake lever 3 is pulled even further, the extension part 3b of the brake lever 3 contacts the contact member 12 of the resistance means 14, so that operating point (B) shown in FIG. 3 is reached.

Figure 2:
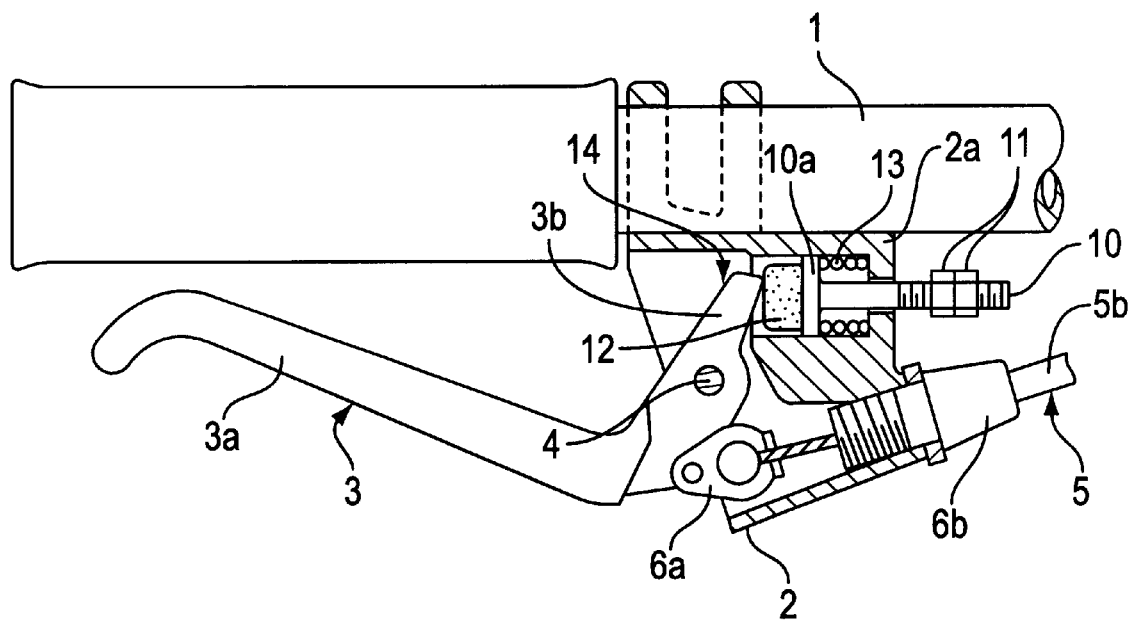
FIG. 2 is a partially cut-away plan view which similarly illustrates the first embodiment of the bicycle brake according to the present invention.
Figure 5:
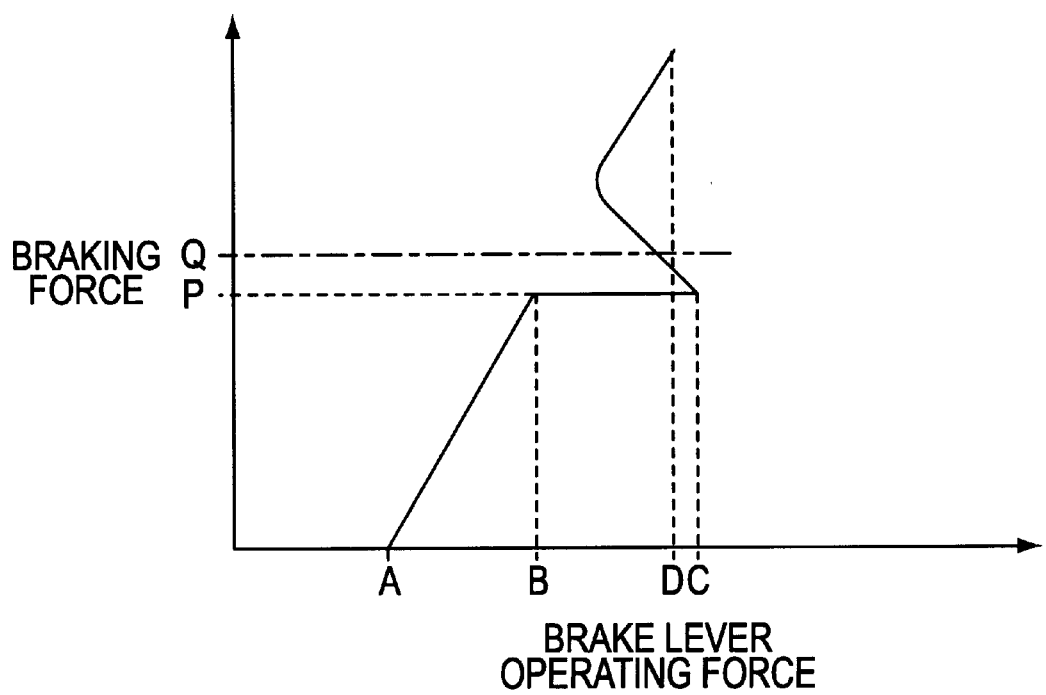
FIG. 5 is a graph illustrating the braking performance of the bicycle brake device shown in FIG. 4.

The coil spring 13 is not installed in a fully extended free state, but is instead installed in a preloaded state with a load of approximately 3 kilograms to 8 kilograms applied. Accordingly, even if an attempt is made to pull the brake lever 3 further from the position of operating point (B), the operating force merely increases without causing any pivoting of the brake lever 3. As a result, the braking force remains level as shown in FIGS. 3 and 5. When operating point (C) is reached where the operating force applied to the brake lever 3 is increased to such an extent that the operating force overcomes the preloading of the coil spring 13, the coil spring 13 is elastically deformed (as shown in FIG. 2) as a result of being clamped between the extension part 3b of the brake lever 3 and the bottom of the cylindrical body 2a on the lever bracket side. Thus, the brake lever 3 again begins to pivot. Subsequently, the braking force increases in proportion to the increase in the operating force, until the stroke end (D) is reached.

Specifically, when the brake lever 3 is pulled as far as a set operating position (B) where the braking force applied by the brake shoes 8 reaches a certain set value (P), any further increase in the braking force is temporarily made impossible by the action of the resistance means 14. However, if an operating force sufficient to overcome the preloading of the coil spring 13 is subsequently applied to the brake lever 3, the coil spring 13 is elastically deformed so that it begins to bend. In other words, the resistance action of the resistance means 14 is released, so that the braking force increases beyond the set value (P). In this case, if the set value (P) is set at a value which is slightly lower than the locking braking force value (Q) at which the wheel locks, the system can be designed so that the brake lever 3 can be operated by means of an extremely light force.

To describe this in detail, it is desirable to be able to operate the brake lever 3 with as light a force as possible. However, if the required operating force is merely decreased, the braking force may exceed the locking braking force value (Q) in cases where the brake lever 3 is unintentionally pulled with an excessively strong force. Thus, the braking device of the present invention is designed so that there is a region where the braking force remains constant at the set value (P) while only the operating force of the brake lever 3 increases as indicated by the region extending from operating point (B) to operating point (C) in FIG. 3. Accordingly, by setting this set value (P) at a value which is slightly lower than the locking braking force value (Q), and setting the preloading value at an appropriate value, it is possible to prevent the braking force from suddenly reaching the locking braking force value (Q), even if (for example) the force required in order to operate the brake lever 3 in the region extending from operating point (A) to operating point (B) is greatly reduced. Furthermore, since most braking is performed with a braking force which is less than the locking braking force value (Q), safe braking which is suited to actual conditions can be achieved. Even so, there may be cases in which a braking force greater than the locking braking force value (Q) is required. In such cases, a rather large operating force is required; nevertheless, a braking force exceeding the locking braking force value (Q) can be reliably obtained by applying an operating force exceeding that shown at operating point (C).

The above mentioned locking braking force value (Q) is influenced by the physical build of the cyclist, and especially by the cyclist's body weight. Adjustments can be made for this by increasing or decreasing the extension of the brake wire 5. It would also be possible to deal with this problem by installing a multiple number of coil springs 13 with different elastic modulus values or lengths (e. g., one spring for use by children, one for use by adults, one for use by women, etc.), and selecting the appropriate spring from this multiple number of springs.

The preloading value of the coil spring 13 is ordinarily in the range of 3 kilograms to 8 kilograms; however, this is also influenced by the strength of the cyclist's grip, etc. Accordingly, the preloading value can be adjusted to suit individual cyclists by adjusting the nut member 11, and depending on the case, it might also be possible to replace the coil spring 13 with a more appropriate coil spring.

Figure 4:
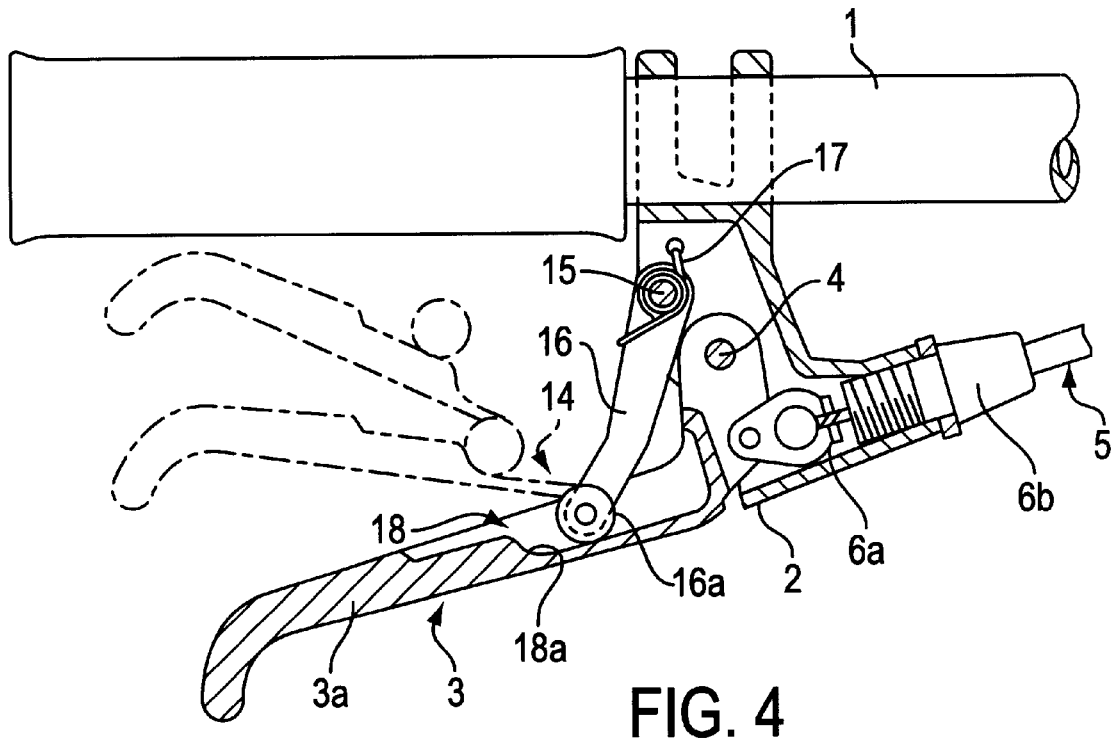
FIG. 4 is a partially cut-away plan view illustrating another embodiment of a bicycle brake device according to the present invention.

FIG. 4 illustrates a second embodiment of a bicycle brake device according to the present invention. As in the first embodiment, a lever bracket 2 is fastened to the handle-bar 1 of the bicycle, and a brake lever 3 is mounted on the lever bracket 2 by means of a pivot shaft 4 so that the brake lever 3 is free to pivot. An attachment part 6a for the inner wire 5a is pivot-mounted on the brake lever 3 in a position located further toward the grip part 3a of the brake lever 3 than the pivot shaft 4, and an attachment part 6b for the outer wire 5b is screw-attached to the lever bracket 2. Furthermore, as in the first embodiment, the brake lever 3 is coupled to a cantilever brake (not shown) by the inner wire 5a, so that braking can be accomplished by pulling the brake lever 3.

This second embodiment differs from the first embodiment in terms of the concrete structure of the resistance means 14. In this second embodiment, another pivot shaft 15 is mounted on the lever bracket 2 in a location closer to the handle-bar 1 than the pivot shaft 4, and a pivoting arm 16 is attached to the pivot shaft 15 so that the pivoting arm 16 is free to pivot. A rotating roller 16a is attached to the free end of this pivoting arm 16 so that the roller 16 is free to rotate, and this rotating roller 16 is elastically driven by a torsion coil spring 17 interposed between the pivoting arm 16 and lever bracket 2, so that the roller 16 is maintained in contact with the inside surface of the brake lever 3. Meanwhile, a cam surface 18 which has a resistance step part 18a is formed on the inside surface of the brake lever 3, so that a resistance means 14 is constituted by this cam surface 18, the pivoting arm 16 and rotating roller 16a, and the spring 17, etc.

In this second embodiment, as in the first embodiment, the braking force increases in proportion to the operating force in the region extending from operating point (A) to the set operating position (B) (following "empty pulling"), as is shown in FIG. 5. This set operating position (B) is the position where the rotating roller 16a reaches the resistance step part 18a of the cam surface 18 of the brake lever 3 (as indicated by the imaginary lines in FIG. 4) after rolling across the cam surface 18 during the pulling operation of the brake lever 3. Even if an attempt is made to pull the brake lever 3 further, the operating force merely increases without any pivoting of the brake lever 3; accordingly, the braking force is maintained at the set value (P).

Afterward, if the operating force is further increased so that operating point (C) is reached, the rotating roller 16 slips over the resistance step part 18a (as indicated by the imaginary lines in FIG. 4) so that the brake lever 3 reaches the stroke end (D). In this second embodiment, the resistance means 14 consisting of the rotating roller 16a and cam surface 18, etc., produces an effect similar to that obtained in the first embodiment.

There are some slight differences between the two embodiments. Specifically, in the case of the first embodiment, as is seen from FIG. 3, the operating force at the stroke end (D) is clearly larger than the operating force at operating point (C); furthermore, since force is required for the elastic deformation of the coil spring 13 in the region extending from operating point (C) to the stroke end (D), the slope of the curve shown in FIG. 3 is somewhat gentler in the region extending from operating point (C) to the stroke end (D) than it is in the region extending from operating point (A) to the set operating position (B).

In the second embodiment, on the other hand, there is no great resistance to the pulling operation of the brake lever 3 once the rotating roller 16a has ridden over the resistance step part 18a of the cam surface 18 (although the spring 17 does have some slight effect). Accordingly, as is seen from FIG. 5, the slope in the region extending from operating point (A) to the set operating position (B) and the slope in the region extending from operating point (C) to the stroke end (D) are more or less the same, and are ultimately positioned on roughly the same line. Furthermore, depending on how the resistance force created by the rotating roller 16a and resistance step part 18a is set, the operating force at the stroke end (D) may be smaller than the operating force at operating point (C) (as shown in FIG. 5).

In the above embodiments, a cantilever brake 7 was described as an example of the brake used. However, there are no particular restrictions on the brake itself; a hand brake, coaster brake or any of various other types of brakes may also be used.

In the first embodiment described above, the cylindrical body 2a was formed as an integral part of the lever bracket 2 from the same material as the lever bracket 2. However, it would also be possible to form the cylindrical body 2a separately from the lever bracket 2. Furthermore, in addition to forming the cylindrical body 2a as a separate part, it would also be possible to construct the cylindrical body 2a so that it can slide relative to the bracket 2, and so that it can be fixed in place as desired, thus making it possible to alter the stroke of the brake lever 3 to the operating point (B). Moreover, the elastic body 13 is not limited to a coil spring. Various other types of elastic bodies could be used; for example, the elastic body 13 could be formed from ordinary rubber, or a part combining rubber and a spring, etc., could be used.

In the second embodiment as well, various mechanisms for providing a temporary resistance to the brake lever 3 could be used besides the above mentioned rotating roller 16a and resistance step part 18a; for example, a projection with an elastic protruding/withdrawing action could be utilized, etc.

Figure 6:
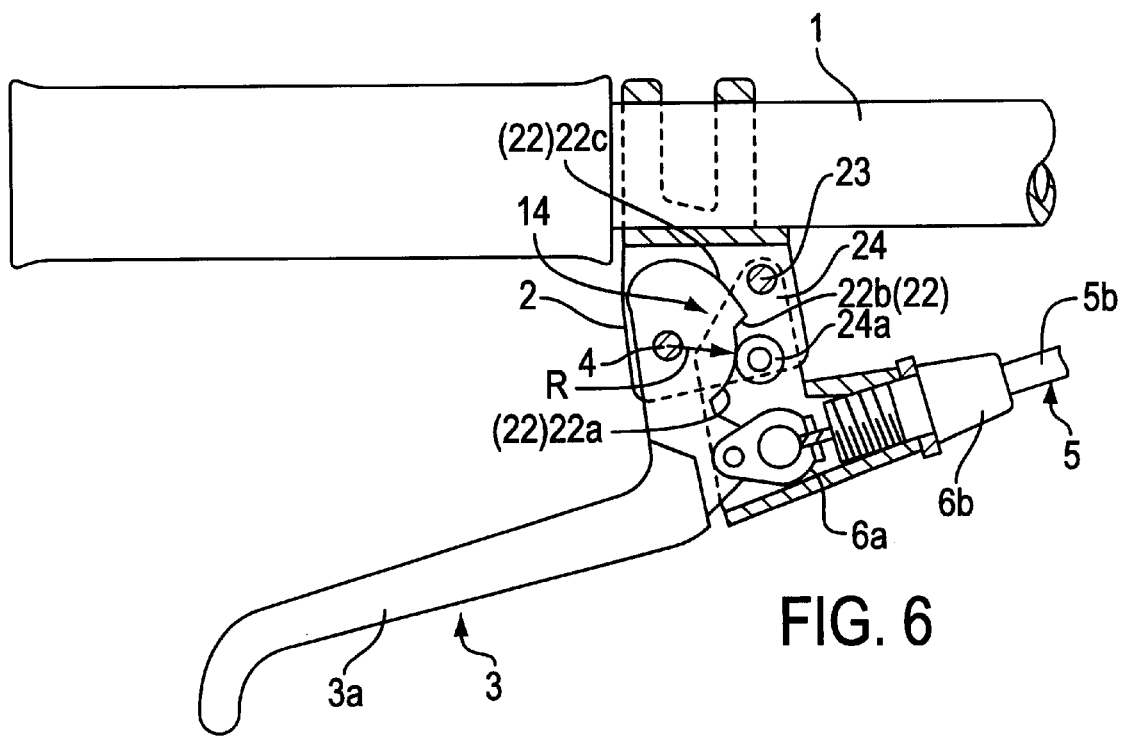
FIG. 6 is a partially cut-away plan view illustrating another embodiment of a bicycle brake device according to the present invention.
Figure 7:
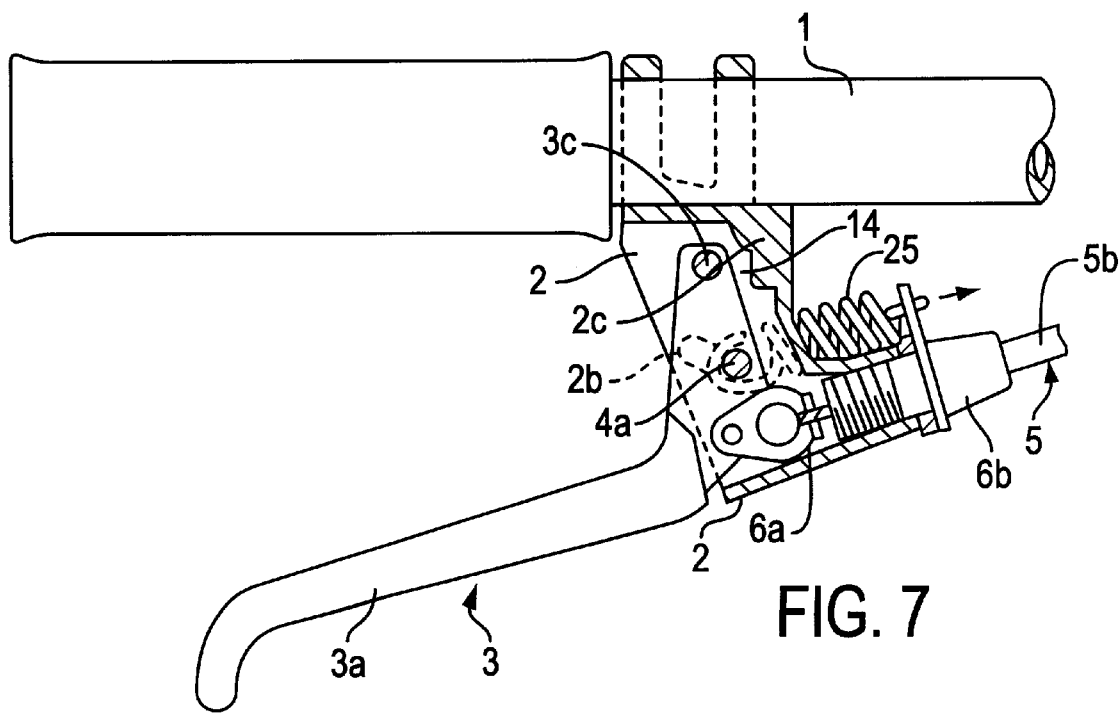
FIG. 7 is a partially cut-away plan view illustrating another embodiment of a bicycle brake device according to the present invention.
Figure 8:
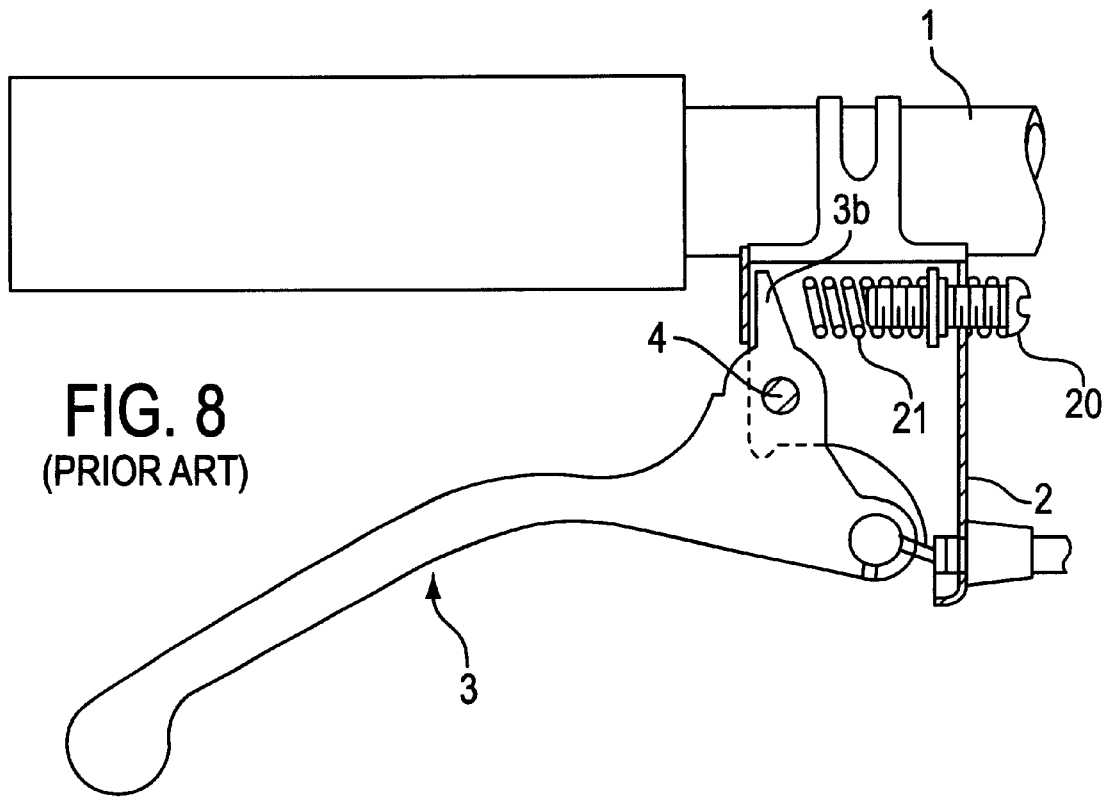
FIG. 8 is a partially cut-away plan view illustrating a conventional bicycle brake device.

Further embodiments of a bicycle brake device are shown in FIGS. 6 and 7. In each embodiment, a resistance means 14 offers a braking performance similar to that obtained in the first embodiment illustrated in FIG. 3.

In the embodiment shown in FIG. 6, a brake lever 3 is mounted on a lever bracket 2 by means of a pivot shaft 4 so that the brake lever 3 is free to pivot, and a cam surface 22 is formed as an integral part of the brake lever 3 near the pivot shaft 4. This cam surface 22 consists of (a) a circular-arc-form first cam surface 22a which has a constant radius of R centered on the pivot shaft 4, (b) an involute-curve-form third cam surface 22c whose distance from the pivot shaft 4 is greater than the constant radius R, with the distance from the pivot shaft 4 showing a gradual increase, and (c) a projection-form second cam surface 22b which connects the cam surfaces 22a and 22c.

A pivoting member 24 is mounted on the lever bracket 2 by means of a pivot shaft 23 which is separate from the pivot shaft 4 of the brake lever 3, so that the pivoting member 24 is free to pivot. The outer wire 5b of the brake wire is attached to an attachment part 6b which is screw-fastened to the pivoting member 24, so that the pivoting member 24 is driven toward the cam surface 22 in a pivoting motion about the pivot shaft 23 by the reaction force of the outer wire 5b. Furthermore, a roller 24a which contacts the cam surface 22 and acts as a cam follower is pivot-mounted on the pivoting member 24 so that the roller 24a is free to rotate. Accordingly, a resistance means 14 is constituted by the pivoting part 24 (including the roller 24a), the cam surface 22 and the outer wire 5b which drives the pivoting part 24.

In this embodiment, the roller 24a moves along the first cam surface 22a of the cam surface 22 during so-called "empty pulling", and during the period in which the operating force gradually increases from operating point (A) where the brake shoes 8 contact the rim. Accordingly, there is no particular pivoting motion of the pivoting member 24, and the braking force increases in proportion to the pulling operation of the brake lever 3. When the brake lever 3 is pulled even further, the second cam surface 22b formed on the brake lever 3 contacts the roller 24a so that operating point (B) shown in FIG. 3 is reached.

A preloading force which causes the pivoting member 24 mounting the roller 14a to pivot toward the cam surface 22 acts on the pivoting member 24 as a result of the reaction force of the outer wire 5b. Furthermore, the second cam surface 22b is formed so that it projects abruptly outward from the first cam surface 22a. As a result, even if an attempt is made to pull the brake lever 3 further from the position of operating point (B), the operating force merely increases without causing any pivoting of the brake lever 3. Accordingly, the braking force remains level. When the operating force applied to the brake lever 3 is further increased so that the roller 24a rides over the top of the second cam surface 22b, i. e., when operating point (C) in FIG. 3 is reached, the brake lever 3 again begins to pivot. At the same time, the third cam surface 22c causes forcible pivoting of the pivoting member 24 via the roller 24a in the opposite direction from the brake lever 3, so that the stroke end (D) is reached.

The embodiment shown in FIG. 7 is also a structure in which a brake lever 3 is mounted on a lever bracket 2 by means of a pivot shaft 4a so that the brake lever 3 is free to pivot; in this structure, however, the pivot shaft 4a is engaged in a slot 2b formed in the lever bracket 2, so that the pivot shaft 4a can move along the slot 2b. Furthermore, the pivot shaft 4a is elastically driven in the direction indicated by the arrow in FIG. 7 by a coil spring 25. In addition, a projecting pin 3c which can engage with a recess 2c formed in the lever bracket 2 is installed on the brake lever 3. Accordingly, a resistance means 14 is constituted by the above mentioned recess 2c, pin 3c, slot 2b and pivot shaft 4a, etc.

In this separate embodiment as well, the brake lever 3 pivots about the pivot shaft 4a during so-called "empty pulling", and during the period in which the operating force gradually increases from operating point (A) where the brake shoes 8 contact the rim. Accordingly, the braking force increases in proportion to the pulling operation of the brake lever 3. When the braking lever 3 is pulled even further, the projecting pin 3c installed on the brake lever 3 engages with the recess 2b formed in the lever bracket 2, so that operating point (B) shown in FIG. 3 is reached.

Accordingly, the brake lever 3, which has been pivoting about the pivot shaft 4a up to this point, suddenly begins to pivot about the pin 3c. As a result, the lever ratio changes abruptly so that a large operating force is required. Accordingly, even if an attempt is made to pull the brake lever 3 further from this operating point (B), the operating force merely increases without causing any pivoting of the brake lever 3, so that the braking force remains level. In this case, if a preloading force is applied to the coil spring 25 which elastically drives the pivot shaft 4a, an even larger operating force will be required. However, even if such a preloading force is not applied, the desired object can be obtained as a result of the abrupt change in the lever ratio.

Subsequently, when the operating force applied to the brake lever 3 is further increased so that operating point (C) is reached, the brake lever 3 pivots about the pin 3c, and the pivot shaft 4a also begins to pivot together with the brake lever 3, so that the stroke end (D) is reached. Thus, braking performance such as that shown in FIG. 3 can also be obtained using the resistance means 14 shown in FIGS. 6 and 7. Furthermore, various other structures could also be employed.

Figure 9:
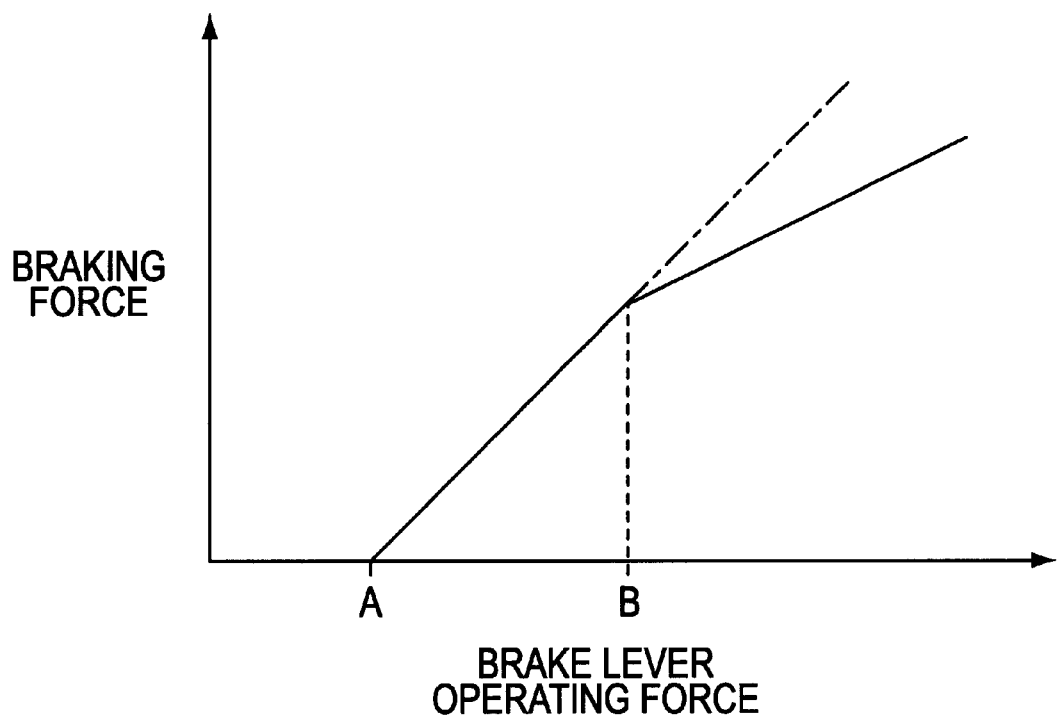
FIG. 9 is a graph illustrating the braking performance of the bicycle brake device shown in FIG. 8.

The foregoing embodiments share a number of advantages. When the wheel braking force reaches a certain set value, any further increase in said braking force is temporarily prevented, with a further increase in the braking force being possible only if an operating force which exceeds a certain set force is applied to the brake lever. Accordingly, instead of a slight change in the slope in the vicinity of the operating point (B), as seen in the conventional case illustrated in FIG. 9, the braking force remains constant at a certain set value (P) as shown in FIGS. 3 and 5, so that a region is created in which only the operating force of the brake lever increases from the operating point (B) to point (C). Consequently, if the operating force at the operating point (C) is appropriately set, sudden wheel locking can be prevented even in cases where the cyclist grasps the brake lever with a strong force all at once.

In the case of normal braking operation, the brakes are almost always operated with a force that is considerably less than the force that would cause wheel locking. Thus, if the set value (P) is set at a value which is slightly lower than the braking force that causes wheel locking, wheel locking can be avoided even if the brake lever operating force required in order to reach the operating point (B) is greatly reduced. In such a case, safe braking operation can be accomplished using a light operating force and, if necessary, a braking force greater than the set value (P) can be obtained by applying an operating force exceeding that indicated at the operating point (C).

By constructing the resistance means from a preloaded elastic body, it is possible to obtain a resistance means which has a complicated action by means of a relatively simple structure. Furthermore, by making the preloading applied to the elastic body adjustable, it is possible not only to deal with changes in elasticity caused by deterioration of the elastic body, but also to adjust the device so that it can be used under optimal conditions in accordance with the grasping force applied by various individual cyclists. In cases where the device is constructed so that (a) the elastic body consists of a coil spring, (b) the adjustment part consists of a nut member, (c) a rod-form body which is mounted inside the coil spring is passed through the lever bracket in such a manner that said rod-form body can move freely through said lever bracket, (d) the coil spring is mounted between (I) a contact member (which contacts the brake lever) installed on one end of the rod-form body, and (ii) the lever bracket, and (e) the nut member is screw-engaged with the other end of the rod-form body passed through the lever bracket, the structure obtained is relatively simple, and all of the above mentioned mechanisms can be mounted in a compact manner on the lever bracket.

Figure 10:
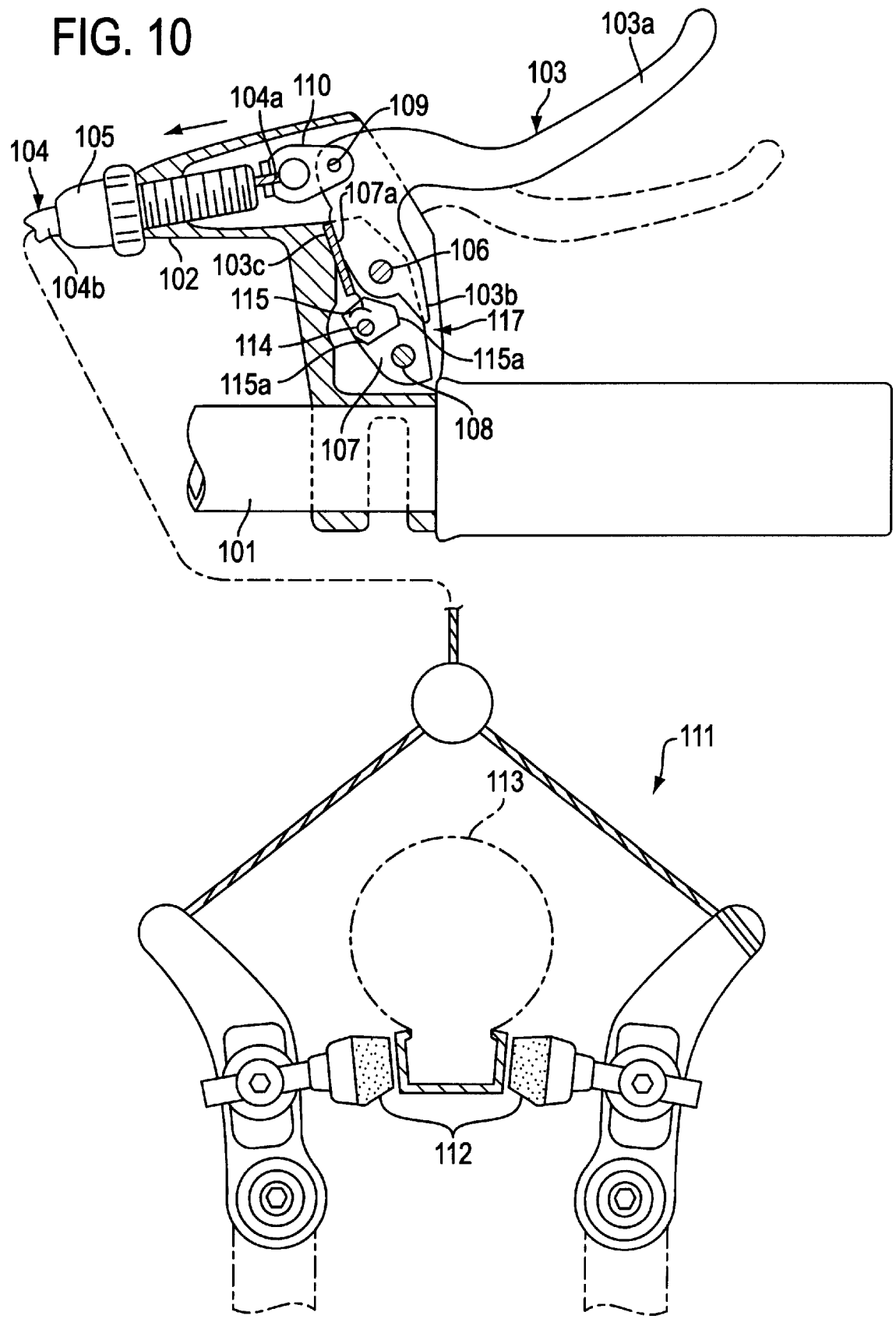
FIG. 10 is a partially cut-away plan view illustrating a particular embodiment of a brake operating device which includes a mechanism for setting the particular position of the brake lever at which the resistance discretely increases according to the present invention.
Figure 11:
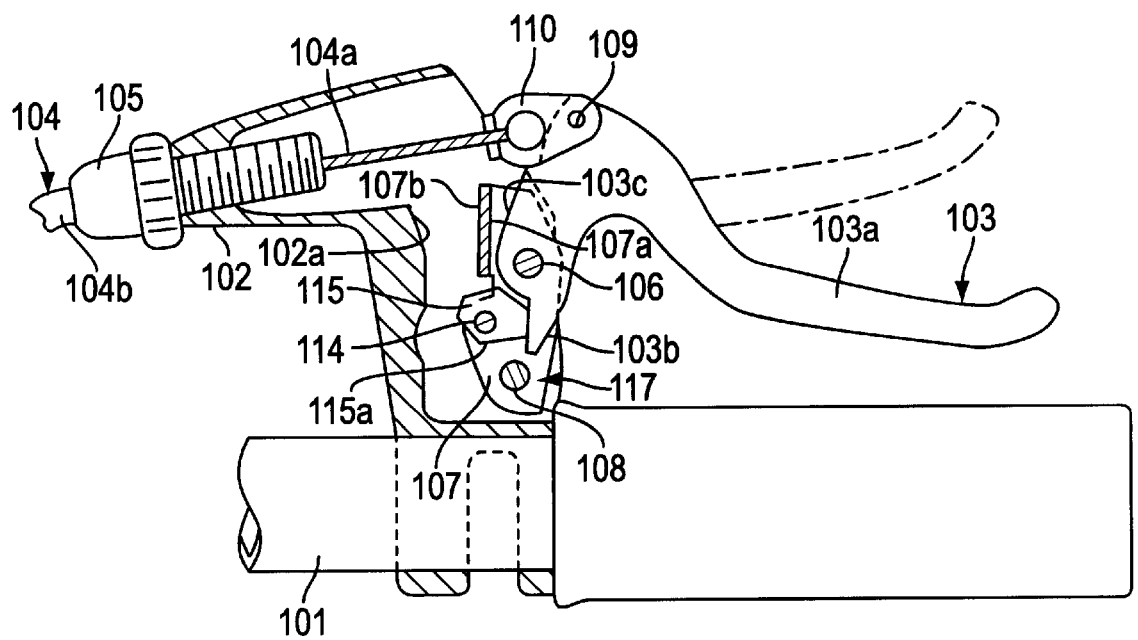
FIG. 11 is a partially cut-away plan view of the brake operating device of FIG. 10 showing the operation of the brake operating device.
Figure 12:
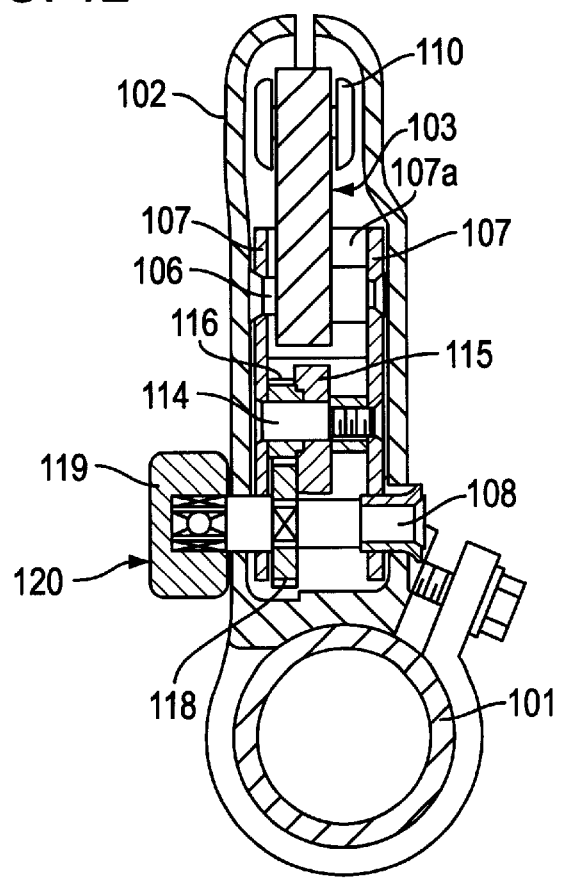
FIG. 12 is a side cross-sectional view of the brake operating device shown in FIG. 10.

FIGS. 10–12 show an embodiment of a brake operating device according to the present invention with a mechanism for setting the particular position of the brake lever at which the resistance discretely increases. As shown therein, a brake operating device, which is fixed to the handlebar 101 of a bicycle (not shown), comprises a bracket 102 which is used to fix the brake operating device to the handlebar 101 and a brake lever 103 attached to bracket 102. An attachment fitting 105 that supports the outer cable 104a of a brake cable 104 is threaded onto the bracket 102.

The brake lever 103 is not pivotally supported directly on the bracket 102, but rather is rotatably and pivotally linked to a pivot member 107 via a first pivot shaft 106, and this pivot member 107 is rotatably and pivotally linked to the bracket 102 via a second pivot shaft 108. A through hole 109 that acts as a linking component in order to link the inner cable 104a of the brake cable 104 is made in the brake lever 103 portion on the grip 103a side of the brake lever 103 away from the first pivot shaft 106 and on the opposite side from the second pivot shaft 108 with this first pivot shaft 106 at the center. The inner cable 104a is linked to the through hole 109 of the brake lever 103 via an attachment fitting 110, and the other end of the inner cable 104a is linked to an ordinary cantilever brake 111. As will be discussed below, when the grip 103a of the brake lever 103 is gripped and the brake lever 103 pulled, the brake shoes 112 of the cantilever brake 111 press against both sides of the rim of the rear wheel 113, thus applying the brakes to this rear wheel 113. When the brake lever 103 is released, just as with a conventional brake device, the return spring (not shown) provided on the cantilever brake 111 causes the brake lever 103 to spring back to its original position.

A rotating shaft 114 is rotatably attached to that portion of the pivot member 107 that is between the first pivot shaft 106 and the second pivot shaft 108, and to this rotating shaft 114 are fixed a stopper member 115, which has a plurality of contact surfaces 115a around it, and a gear 116. The brake lever 103 is integrally provided with a lug member 103b that projects out toward the stopper member 115 side. When the brake lever 103 is rotated a specific angle around the first pivot shaft 106, this lug member 103b comes into contact with one of the contact surfaces 115a of the stopper member 115, which temporarily prevents the brake lever 103 from rotating any further.

The second pivot shaft 108 is rotatably supported by the bracket 102, and to this second pivot shaft 108 is fixed another gear 118 that engages with the gear 116 of the first pivot shaft 106. A knob-like operating component 119 is attached to the portion of second pivot shaft 108 that sticks out of the bracket 102. When this operating component 119 is rotated, the first pivot shaft 106 is rotated via the two gears 116 and 118, the stopper member 115 fixed to this first pivot shaft 106 is rotated, and the contact surface 115a with which the lug member 103b of the brake lever 103 comes into contact can be freely selected.

The action of the brake device in this embodiment will now be described. The inner cable 104a of the brake cable 104 is usually pulled in the direction of the arrow shown in FIG. 10 by the return spring ordinarily provided on the cantilever brake 111. As a result, the brake lever 103 is biased in the counterclockwise direction of FIG. 10 centered around the first pivot shaft 106, but the contact surface 103c of the brake lever 103 comes into contact with the inner surface 107a of the pivot member 107, which has a U-shaped cross sectional shape, and the outer surface 107b of this pivot member 107 comes into contact a movement blocking surface 102a provided to the bracket 102, so the state shown in FIG. 10 is usually maintained.

Figure 13:
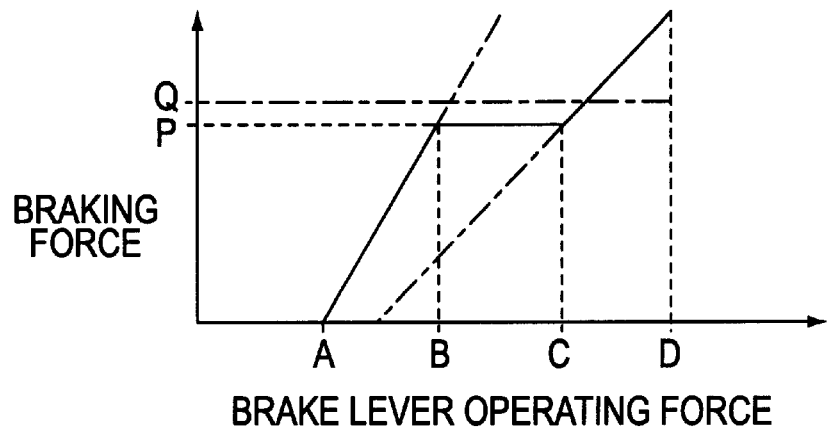
FIG. 13 is a graph of the braking performance of the brake operating device shown in FIG. 10.

When the grip 103a of the brake lever 103 is gripped and pulled from this state, the first thing that happens is that the brake lever 103 rotates around the first pivot shaft 106, the operating force thereof is transmitted to the cantilever brake 111 via the inner cable 104a, and the brake shoes 112 move toward the rim of the rear wheel 113. At first, the brake shoes 112 meet no resistance, and almost no operating force is required until they come into contact with the rim. However, as shown in FIG. 13, the operating force gradually increases from the operation point A where the brake shoes 112 come into contact with the rim, and the braking force also increases proportionally. When the brake lever 103 is pulled further, the lug member 103b that projects out from the brake lever 103 comes into contact with one of the contact surfaces 115a of the stopper member 115, which is part of the stopper means 117, and reaches the operation point B shown in FIG. 13.

As a result, further rotation of the brake lever 103 around the first pivot shaft 106 is prevented, so the brake lever 103 tries to rotate clockwise around the second pivot shaft 108. However, since the distance from the second pivot shaft 108 to the inner cable 104a is greater than the distance from the first pivot shaft 106 to the inner cable 104a, the rotational moment originating in the tension of the inner cable 104a increases sharply, so even if an attempt is made to pull the brake lever 103 beyond the operation point B, the operating force will merely increase and the brake lever 103 will not rotate, and the braking force will remain at the same level.

If the operating force is further increased against the brake lever 103 until the operation point C is reached, as shown in FIG. 11, the brake lever 103 will rotate around the second pivot shaft 108 integrally with the pivot member 107, and after this resumption of rotation there will also be an increase in the braking force proportional to the increase in operating force until the stroke end D is reached.

In other words, when the brake lever 103 is pulled up to the set operation position B, at which the braking force on the rear wheel 113 produced by the brake shoes 112 reaches a certain setting, then the action of the stopper means 117 temporarily renders any further increases in braking force impossible. Thereafter, however, if further operating force is applied to the brake lever 103, it will again become possible to pull the brake lever 103. That is, the stopper action of the stopper means 117 will be released, and the braking force will increase over the setting P.

It is possible to design the system such that if the setting P is set somewhat lower than the lock-up braking value Q at which the rear wheel locks up, the brake lever 103 can be operated extremely lightly. To be more specific, it is preferable for the operation of the brake lever 103 to be as light as possible, but if it is merely made lighter, the braking force will go over the lock-up braking value Q if the brake lever 103 is unconsciously pulled too strongly all at once. With the brake device of the present invention there is a region in which the braking force remains constant at the setting P and only the operating force of the brake lever 103 increases, as shown by operation points B to C in FIG. 13. If this setting P is set somewhat lower than the lock-up braking value Q, then even if the operating force of the brake lever 103 is made much lighter from the operation point A to the operation point B, for example, the braking force can still be prevented from reaching the lock-up braking value Q. Of course, in some cases a braking force over the lock-up braking value Q may be desired. In such cases, a fairly high braking force will be needed, but if an operating force over that at the operation point C is applied, a braking force over the lock-up braking value Q can be reliably obtained.

The lock-up braking value Q is affected by the build, and particularly the weight, of the cyclist, and also varies slightly with various riding conditions, such as when going up or down a hill. Thus, the operating component 119, which is part of the setting changing means 120, is rotated as needed to change the setting P to the desired value. In other words, each of the contact surfaces 115a of the stopper member 115 that rotates along with the operating component 119 is at a different distance from the center of the rotation shaft 114 thereof, so the contact surfaces 115a can be selected so as to change the angle of rotation through which the brake lever 103 goes until the lug member 103b of the brake lever 103 comes into contact with that contact surface 115a, that is, to change the position of the operation point B shown in FIG. 13, and change the setting P to the desired value.

Figure 14:
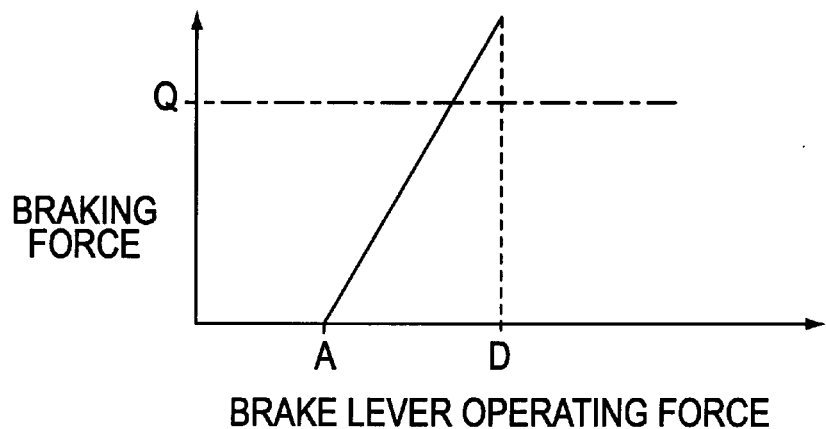
FIG. 14 is a graph of a selected braking performance of the brake operating device shown in FIG. 10.
Figure 15:
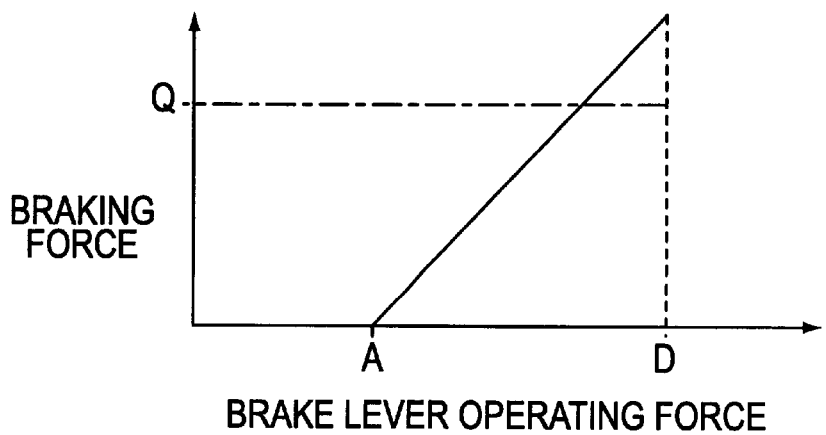
FIG. 15 is a graph of another selected braking performance of the brake operating device shown in FIG. 10.

The contact surface 115a whose distance from the center of the rotation shaft 114 is the shortest may be set such that the stroke end D will be reached before the lug member 103b comes into contact with this contact surface 115a when the brake lever 103 is pulled. In this case the braking performance is as shown in FIG. 14, with operation points B and C shown in FIG. 13 being absent up to the stroke end D, so braking that feels the same as in the past is possible. Furthermore, although not particularly provided in the practical example illustrated in FIGS. 10 through 12, the distance from the center of the rotation shaft 114 can be lengthened so that a contact surface 115a with which the lug member 103b comes into contact is provided from the start of the pulling operation of the brake lever 103, in which case the braking performance will be as shown in FIG. 15, meaning that the braking will feel a little heavier than that in FIG. 14.

FIG. 16 is a partially cut-away view illustrating an alternative embodiment of a brake operating device according to the present invention. Those parts that are the same or have the same action as in the embodiment shown in FIG. 10 will be labeled with the same symbols and their detailed description omitted in an effort to avoid redundant description. In this embodiment, the brake lever 103 is directly pivotally supported and on the bracket 102 via a pivot shaft 121. However, this pivot shaft 121 is encased in a slot 122 made in the bracket 102 and is able to move back and forth in this slot 122. The pivot shaft 121 is elastically biased in the direction of the arrow in the figure by a coil spring 123 interposed between this pivot shaft 121 and the bracket 102.

A pin 124 sticks out from the brake lever 103 portion on the opposite side from the attachment fitting 110 of the inner cable 104a and centered around this pivot shaft 121. A bolt 125 with which the pin 124 comes into contact is threaded on the bracket 102 side. Thus, the pin 124, the bolt 125, etc., make up the stopper means 117, with the setting changing means 120 comprising the threaded bolt 125, etc.

In this embodiment, the brake lever 103 rotates around the pivot shaft 121 during the time while the brake shoes 112 go from a state of no resistance to a gradual increase in operating force from the operation point A where the brake shoes 112 come into contact with the rim, and the braking force also increases in proportion to the pulling of the brake lever 103. When the brake lever 103 is further pulled, the pin 124 sticking out from the brake lever 103 comes into contact with the bolt 125 on the bracket 102 side, thus reaching the operation point B shown in FIG. 13. At this time, further rotation of the brake lever 103 around the pivot shaft 121 is prevented, and the brake lever 103, which up to now had been rotating around the pivot shaft 121, suddenly tries to rotate around the pin 124. By exactly the same action as in the embodiment shown in FIG. 10, even if an attempt is made to pull the brake lever 103 beyond the position of the operation point B, the operating force merely increases and the brake lever 103 will not rotate, and the braking force will remain at the same level. When the operating force on the brake lever 103 is further increased and the operation point C is reached, the brake lever 103 resumes rotation along the slot 122 together with the pivot shaft 121 and around the pin 124 until the stroke end D is reached.

In this embodiment, the setting P can be continuously varied and adjusted by adjustment of the bolt 125, and if the bolt is removed or moved out so as to increase its distance from the pin 124, the braking performance shown in FIG. 14 will result, and if the bolt 125 is moved in and set such that it will come into contact with the pin 124 from the start of the pulling operation of the brake lever 103, the braking performance shown in FIG. 15 can be obtained.

If desired, the position of the operation point C can be shifted to the right in FIG. 13 if a preload is applied to the coil spring 123 that elastically biases the pivot shaft 121, and the slope from the operation point C to the stroke end D can be changed by replacing the coil spring 123 with one having a different elastic force.

FIG. 17 is a partially cut-away view illustrating another alternative embodiment of a brake operating device according to the present invention. In this embodiment, brake lever 103 is pivotally linked directly to the bracket 102 via a pivot shaft 126, but unlike in the embodiment shown in FIG. 16, this pivot shaft 126 is unable to move relative to the bracket 102. An arcuate first cam surface 127a having a constant radius R around the pivot shaft 126 is formed integrally with the brake lever 103 at a place on the brake lever 103 near pivot shaft 126, and an operation member 128 that is rotatable and can be fixed with respect to the brake lever 103 is provided around pivot shaft 126. This operation member 128 is provided with an involute curve-shaped third cam surface 127c that has a radial distance longer than the radius R of the first cam surface 127a, with this distance gradually lengthening, and a protruding second cam surface 127b that links this third cam surface 127c and the first cam surface 127a on the brake lever 103 side. The design here is such that a single cam surface that links these three cam surfaces 127a, 127b, and 127c is formed.

A swing member 130 is rotatably pivoted by a pivot shaft 129 on the bracket 102, an outer cable 104b is attached to the attachment fitting 105 threaded onto this swing member 130, and the reaction force of this outer cable 104b biases the swing member 130 to swing around the pivot shaft 129 toward the cam surface side. A roller 131 that is in contact with the cam surface and acts as a cam follower is rotatably pivoted on this swing member 130, and the stopper means 117 is made up of this roller 131, the cam surfaces 127a, 127b, and 127c, and so on, while the setting changing means 120 comprises the operation member 128 and so on.

In this embodiment, the roller 131 slides over the first cam surface 127a during the time while the brake shoes 112 go from a state of no resistance to a gradual increase in operating force from the operation point A where the brake shoes 112 come into contact with the rim, so there is no particular swinging of the swing member 130, and the braking force increases in proportion to the pulling of the brake lever 103. When the brake lever 103 is further pulled, the cam surface 127b of the operation member 128, which rotates integrally with this brake lever 103, comes into contact with the roller 131, thus reaching the operation point B shown in FIG. 13.

Since the reaction of the outer cable 104b causes a force to act on the swing member 130 that pivots this roller 131 such that it swings toward the cam surface, and since the cam surface 127b is formed such that it juts sharply outward from the first cam surface 127a, even if an attempt is made to pull the brake lever 103 beyond the position of this operation point B, the operating force will merely increase and the brake lever 103 will not rotate, and the braking force will therefore remain at the same level. When the operating force on the brake lever 103 is further increased and the roller 131 goes over the top of the cam surface 127b, that is, when the operation point C in FIG. 13 is reached, the rotation of the brake lever 103 will resume and, at the same time, the third cam surface 127c will cause the swing member 130 to be forcibly rotated via the roller 131 in the opposite direction from that of the brake lever 103 until the stroke end D is reached.

In this embodiment, the setting P can be continuously varied and adjusted by changing the fixed position of the operation member 128 with respect to the brake lever 103 and by changing the positions of the cam surface 127b and the third cam surface 127c with respect to the first cam surface 127a. The braking performance shown in FIG. 14 will result when the operation member 128 is fixed farther away toward the opposite side of the roller 131, and the braking performance shown in FIG. 15 can be obtained by rotating and fixing the operation member 128 toward the roller 131 side so that the cam surface 127b will come into contact with the roller 131 from the start of the pulling operation of the brake lever 103.

While the above is a description of various embodiments of the present invention, further modifications may be employed without departing from the spirit and scope of the present invention. For example, the present invention can also be implemented with a band brake, a coaster brake, or various other types of brake. In the described embodiments the stopper means 117 and the setting changing means 120 were provided to the brake lever, but it is also possible to use an ordinary brake lever and provide the stopper means 117 and setting changing means 120 to the brake side of the cantilever brake 111 or the like. In the embodiment shown in FIG. 10 the setting P was varied and adjusted in stages by forming a plurality of contact surfaces 115a around the stopper member 115, but it is also possible to vary and adjust the setting P continuously by using the outside of the stopper member 115 as a continuous contact surface. In the embodiment shown in FIG. 16, the setting P can be varied and adjusted in stages by using a rod capable of varying the amount of protrusion in a plurality of stages with respect to the bracket 102 instead of the bolt 125. In the embodiment shown in FIG. 17 the setting P can be varied and adjusted in stages by fixing operation members 128 at a plurality of places with respect to the brake lever 103. Thus, the scope of the invention should not be limited by the specific structures disclosed. Instead, the true scope of the invention should be determined by the following claims.

What is claimed is:

1. A brake operating device for a bicycle comprising:
   a brake lever for pivotally mounting to a mounting member;
   resistance means, disposed between the brake lever and the mounting member, for discretely increasing resistance to movement of the brake lever when the brake lever moves to a particular position;
   wherein a plot line of braking force as a function of brake lever operating force includes a first change of direction at the brake lever operating force corresponding to the particular position;
   wherein the plot line of braking force as a function of brake lever operating force includes a second change of direction at the brake lever operating force corresponding to a higher force; and
   wherein the braking force remains constant between the brake lever operating force corresponding to the particular position and the brake lever operating force corresponding to the higher force so that the plot line forms a horizontal step.

2. The brake according to claim 1 wherein the resistance means comprises a resistance element coupled to one of the lever or the mounting member which contacts an engaging member coupled to the other one of the lever or mounting member so that such contact resists further movement of the lever.

3. The brake according to claim 2 wherein the resistance element comprises a preloaded resistance member.

4. The brake according to claim 3 further comprising preload adjusting means for adjusting the preload of the resistance element.

5. The brake according to claim 2 wherein the resistance element comprises a spring.

6. The brake according to claim 2 wherein the resistance element comprises a preloaded spring.

7. The brake according to claim 6 further comprising preload adjusting means for adjusting the preload of the spring.

8. The brake according to claim 2 wherein the resistance element comprises a precompressed coil spring.

9. The brake according to claim 2 wherein the brake lever is pivotally mounted to a lever bracket through a pivot shaft so that a grip part of the brake lever extends from the pivot shaft in one direction and an extension part extends from the pivot shaft in another direction, wherein the engaging member is disposed on the extension part, and wherein the resistance element is mounted to the lever bracket.

10. The brake according to claim 2 wherein the resistance element comprises a stepped surface, and wherein the engaging member moves along the stepped surface as the brake lever is moved so that a step resists further movement of the brake lever.

11. The brake according to claim 10 further comprising a moveable member having a first portion movably coupled to one of the brake lever or the mounting member and a second portion coupled to one of the stepped surface or the engaging member so that the moveable member moves as the engaging member moves along the stepped surface.

12. The brake lever according to claim 11 wherein the brake lever is pivotally coupled to a lever bracket through a first pivot shaft so that a grip part of the brake lever extends from the first pivot shaft in one direction and an extension part extends from the first pivot shaft in another direction, and wherein the moveable member is pivotally coupled to the lever bracket through a second pivot shaft.

13. The brake according to claim 12 wherein the stepped surface is disposed on the extension part of the brake lever and the engaging member is disposed on the moveable member.

14. The brake according to claim 13 wherein the engaging member comprises a roller rotatably coupled to the second portion of the moveable member.

15. The brake lever according to claim 11 wherein the brake lever is pivotally coupled to a lever bracket through a first pivot shaft so that a grip part of the brake lever extends from the first pivot shaft, and wherein the moveable member is pivotally coupled to the lever bracket through a second pivot shaft.

16. The brake according to claim 15 wherein the stepped surface is disposed on the grip part of the brake lever and the engaging member is disposed on the moveable member.

17. The brake according to claim 16 wherein the engaging member comprises a roller rotatably mounted to the second portion of the moveable member.

18. The brake according to claim 17 further comprising a spring disposed between the moveable member and the lever bracket.

19. The brake according to claim 18 wherein the spring comprises a coil spring disposed about the second pivot shaft.

20. The brake according to claim 2, wherein the brake lever is mounted to the mounting member at a mounting location and is adapted both to pivot about the mounting location and to move linearly relative to the mounting location, wherein the brake lever includes a grip portion extending from the mounting location, and wherein the resistance element is located so that the brake lever pivots about the mounting location until the resistance element contacts the engaging member, and thereafter the lever pivots about the point of contact between the resistance element and the engaging member.

21. The brake according to claim 20 wherein a distance between the point of contact of the resistance element and the engaging member to the grip portion of the brake lever in a direction perpendicular to the grip portion of the brake lever is greater than a distance between the mounting location and the grip portion of the brake lever in a direction perpendicular to the grip portion of the brake lever.

22. The brake according to claim 21 further comprising a spring disposed between the brake lever and mounting member for further increasing resistance to movement of the brake lever when the brake lever pivots about the point of contact between the resistance element and the engaging member.

23. The brake according to claim 21 wherein a first pivot shaft is mounted to the brake lever, the first pivot shaft being disposed within a slot formed within the mounting member at the mounting location so that the brake lever pivots about the first pivot shaft until the engaging member contacts the resistance element, and thereafter the first pivot shaft moves linearly within the slot.

24. The brake according to claim 23 further comprising a spring disposed between the first pivot shaft and mounting member for further increasing resistance to movement of the brake lever when the brake lever pivots about the point of contact between the resistance element and the engaging member.

25. The brake according to claim 23 wherein the engaging member comprises a second pivot shaft coupled to an extension portion of the brake lever, and wherein the resistance member comprises an abutment disposed on the mounting member.

26. The brake according to claim 25 wherein the abutment includes a recess for receiving the second pivot shaft.

27. A brake operating device according to claim 1 wherein the resistance means comprises:

pivot member pivotally coupled to the brake lever at a first location and to the mounting member at a second location;

a stopper disposed between the pivot member and the brake lever; and a portion of the brake lever for contacting the stopper when the brake lever pivots about the first location.

28. A brake operating device according to claim 27 wherein the brake lever includes a cable attachment portion, and wherein the first location is disposed between the cable attachment portion and the second location.

29. A brake operating device according to claim 28 wherein the stopper is disposed between the first location and the second location.

30. The brake according to claim 1 further comprising setting means for setting the particular position of the brake lever at which the resistance discretely increases.

31. A brake operating device according to claim 30 wherein the resistance means comprises:

a pivot member pivotally coupled to the brake lever at a first location and to the mounting member at a second location;

a stopper disposed between the pivot member and the brake lever; and a portion of the brake lever for contacting the stopper when the brake lever pivots about the first location.

32. A brake operating device according to claim 31 wherein the stopper is movably mounted relative to the portion of the brake lever and includes a contact surface which varies in shape so that the portion of the brake lever contacts the contact surface at different positions depending upon the relative position of the stopper.

33. A brake operating device according to claim 32 wherein the setting means comprises an externally disposed operating component coupled to the stopper.

34. A brake operating device according to claim 33 wherein the stopper is pivotally mounted to the pivot member, wherein the operating component is pivotally mounted to the mounting member, and wherein the setting means further comprises a first gear mounted to the stopper for rotation therewith and a second gear mounted to the operating component for rotation therewith.

35. A brake operating device according to claim 34 wherein the first gear meshes directly with the second gear.

36. A brake operating device according to claim 31 wherein the brake lever includes a cable attachment portion, and wherein the first location is disposed between the cable attachment portion and the second location.

37. A brake operating device according to claim 36 wherein the stopper is disposed between the first location and the second location.

38. A brake operating device according to claim 37 wherein the stopper is movably mounted relative to the portion of the brake lever and includes a contact surface which varies in shape so that the portion of the brake lever contacts the contact surface at different positions depending upon the relative position of the stopper.

39. A brake operating device according to claim 38 wherein the setting means comprises an externally disposed operating component coupled to the stopper.

40. A brake operating device according to claim 39 wherein the stopper is pivotally mounted to the pivot member, wherein the operating component is pivotally mounted to the mounting member, and wherein the setting means further comprises a first gear mounted to the stopper for rotation therewith and a second gear mounted to the operating component for rotation therewith.

41. A brake operating device according to claim 40 wherein the first gear meshes directly with the second gear.

42. A brake operating device according to claim 30 wherein the brake lever is mounted to the mounting member at a mounting location and is adapted both to pivot about the mounting location and to move linearly relative to the mounting location, wherein the resistance means includes a stopper and a portion of the brake lever adapted to contact the stopper, wherein the stopper is located so that the brake lever pivots about the mounting location until the portion of the brake lever contacts the stopper, and thereafter the lever pivots about the point of contact between the portion of the brake lever and the stopper.

43. A brake operating device according to claim 42 wherein the stopper comprises a bolt, and wherein the setting means comprises a threaded portion of the bolt.

44. A brake operating device according to claim 42 wherein the brake lever includes a cable attachment portion, and wherein the mounting location is disposed between the cable attachment portion and the stopper.

45. A brake operating device according to claim 44 further comprising a spring disposed between the brake lever and mounting member for further increasing resistance to movement of the brake lever when the brake lever pivots about the point of contact between the portion of the brake lever and the stopper.

46. A brake operating device according to claim 44 wherein a pivot shaft is mounted to the brake lever, the pivot shaft being disposed within a slot formed within the mounting member at the mounting location so that the brake lever pivots about the pivot shaft until the portion of the brake lever contacts the stopper, and thereafter the pivot shaft moves linearly within the slot.

47. A brake operating device according to claim 46 further comprising a spring disposed between the pivot shaft and mounting member for further increasing resistance to movement of the brake lever when the brake lever pivots about the point of contact between the portion of the brake lever and the stopper.

48. A brake operating device according to claim 47 wherein the stopper comprises a bolt, and wherein the setting means comprises a threaded portion of the bolt.

49. A brake operating device according to claim 30 wherein the resistance means comprises:

a stepped surface; and an engaging member which moves along the stepped surface as the brake lever is moved so that a step resists further movement of the brake lever.

50. A brake operating device according to claim 49 further comprising a moveable member movably coupled to the mounting member and supporting the engaging member so that the moveable member moves as the engaging member moves along the stepped surface.

51. A brake operating device according to claim 50 wherein the brake lever is pivotally coupled to the mounting member at a mounting location so that a grip part of the brake lever extends from the mounting location and an extension part forming a first cam surface radially extends from the mounting location, and wherein the stepped surface is disposed on the extension part of the brake lever.

52. A brake operating device according to claim 51 wherein the setting means comprises a cam member pivotally mounted relative to the extension part and having a second cam surface which extends further than the first cam surface for forming the step, wherein a position of the cam member determines the position of the step and thereby the particular position of the brake lever at which the resistance discretely increases.

* * * * *